US011901973B2

(12) United States Patent
Avasarala et al.

(10) Patent No.: US 11,901,973 B2
(45) Date of Patent: Feb. 13, 2024

(54) PROXIMITY DETECTION

(71) Applicant: QUALCOMM Incorporated, San Diego, CA (US)

(72) Inventors: Sanjay Avasarala, San Diego, CA (US); Ryan Scott Castro Spring, San Diego, CA (US); Udara Fernando, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 17/237,595

(22) Filed: Apr. 22, 2021

(65) Prior Publication Data
US 2022/0345180 A1  Oct. 27, 2022

(51) Int. Cl.
*H04B 7/0413* (2017.01)

(52) U.S. Cl.
CPC .................. *H04B 7/0413* (2013.01)

(58) Field of Classification Search
CPC ............... H04B 7/0413; H04B 5/02
See application file for complete search history.

(56) References Cited

U.S. PATENT DOCUMENTS

| 2011/0250928 A1 | 10/2011 | Schlub et al. |
| 2018/0054196 A1 | 2/2018 | Yang et al. |
| 2019/0044561 A1 | 2/2019 | Fernando et al. |
| 2019/0302250 A1 | 10/2019 | Sahin et al. |
| 2019/0393918 A1 | 12/2019 | Han et al. |
| 2020/0411960 A1 | 12/2020 | Ng et al. |

FOREIGN PATENT DOCUMENTS

WO    WO-2019078837 A1 *   4/2019   ............... G01V 3/08

OTHER PUBLICATIONS

International Search Report and Written Opinion—PCT/US2022/071338—ISA/EPO—dated Aug. 9, 2022.

* cited by examiner

*Primary Examiner* — Rahel Guarino
(74) *Attorney, Agent, or Firm* — Patterson & Sheridan, L.L.P./Qualcomm Incorporated

(57) ABSTRACT

Certain aspects of the present disclosure provide object detection based on perturbations in a channel model over time. An example portable apparatus includes a primary antenna, a secondary antenna, a transmit path, a radio frequency (RF) coupler, and a receive path. The transmit path is coupled to the primary antenna and configured to output a transmit signal for transmission via the primary antenna. The RF coupler is coupled to the secondary antenna. The receive path has an input selectively coupled between the transmit path and the RF coupler such that when the receive path is coupled to the RF coupler and configured to operate concurrently with the transmit path, the receive path is configured to receive a reflected portion of the transmit signal from an object located in proximity to the portable apparatus.

30 Claims, 8 Drawing Sheets

PROXIMITY DETECTION

BACKGROUND

Field of the Disclosure

Aspects of the present disclosure relate to electronic devices, and more particularly, to detection of objects in proximity to the electronic devices.

Description of Related Art

Electronic devices include traditional computing devices such as desktop computers, notebook computers, tablet computers, smartphones, wearable devices like a smartwatch, internet servers, and so forth. These various electronic devices provide information, entertainment, social interaction, security, safety, productivity, transportation, manufacturing, and other services to human users. These various electronic devices depend on wireless communications for many of their functions. Wireless communication systems and devices are widely deployed to provide various types of communication content such as voice, video, packet data, messaging, broadcast, and so on. Wireless communication devices may transmit and/or receive radio frequency (RF) signals via any of various suitable radio access technologies (RATs) including, but not limited to, 5G New Radio (NR), Long Term Evolution (LTE), Code Division Multiple Access (CDMA), Time Division Multiple Access (TDMA), Wideband CDMA (WCDMA), Global System for Mobility (GSM), Bluetooth, Bluetooth Low Energy (BLE), ZigBee, wireless local area network (WLAN) RATs (e.g., IEEE 802.11), and the like.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include desirable transmit data rates, transmit latencies, and/or transmit signal quality from a transmitting entity due to the various object detection techniques described herein.

Certain aspects of the present disclosure can be implemented in a portable apparatus. The portable apparatus generally includes a primary antenna, a secondary antenna, a transmit path, a radio frequency (RF) coupler, and a receive path. The transmit path is coupled to the primary antenna and configured to output a transmit signal for transmission via the primary antenna. The RF coupler is coupled to the secondary antenna. The receive path has an input selectively coupled between the transmit path and the RF coupler such that when the receive path is coupled to the RF coupler and configured to operate concurrently with the transmit path, the receive path is configured to receive a reflected portion of the transmit signal from an object located in proximity to the portable apparatus.

Certain aspects of the present disclosure can be implemented in a portable apparatus. The portable apparatus generally includes a primary antenna, a secondary antenna, a transmit path, a first RF coupler, a receive path, a diversity path, a memory, and a processor. The transmit path is coupled to the primary antenna and configured to output a transmit signal for transmission via the primary antenna. The first RF coupler is coupled to the secondary antenna. The receive path has an input selectively coupled between the transmit path and the first RF coupler. The secondary antenna comprises a diversity antenna, and the first RF coupler is a diversity coupler coupled to the diversity path and selectively coupled to the receive path. The processor is coupled to the memory, and the processor and the memory are configured to operate the portable apparatus in an object detection mode, which includes the receive path being coupled to the first RF coupler, being configured to operate concurrently with the transmit path, and being configured to receive a reflected portion of a transmit signal from an object located in proximity to the portable apparatus.

Certain aspects of the present disclosure can be implemented as a method of operating a portable apparatus. The method generally includes transmitting a transmit signal from a primary antenna coupled to a transmit path. The method also includes receiving, based on the transmission, one or more receive signals at a receive path via a secondary antenna and an RF coupler coupled to the secondary antenna, wherein the receive path has an input selectively coupled between the transmit path and the RF coupler. The method further includes detecting a presence of an object within a range of the portable apparatus based on the one or more receive signals.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
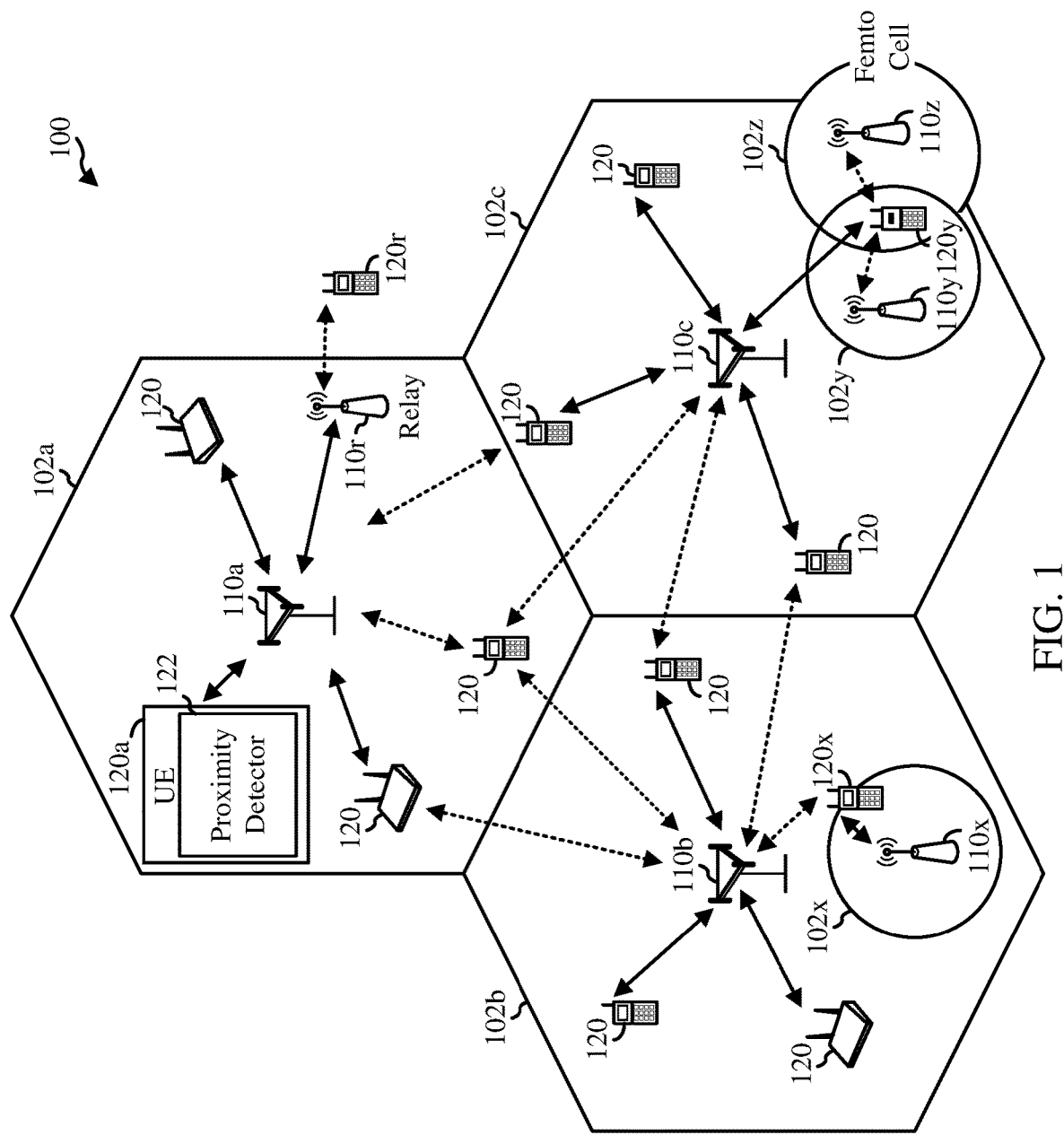
FIG. 1 is a block diagram conceptually illustrating an example wireless communication network, in accordance with certain aspects of the present disclosure.
Figure 1:
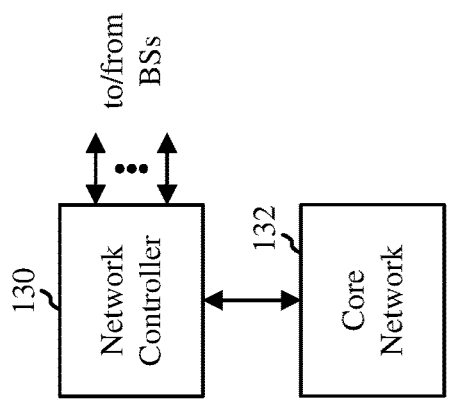

Aspects of the present disclosure provide apparatus, methods, processing systems, and computer-readable mediums for object detection using (e.g., a channel model between) a transmit antenna and a receive antenna.

The following description provides examples of object detection (including detection of the presence, proximity, distance, or location of an object) in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Certain frequencies support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other communication systems.

NR access may support various wireless communication services, such as enhanced mobile broadband (eMBB) targeting wide bandwidth (e.g., 80 MHz or beyond), millimeter wave (mmWave) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming, and beam direction may be dynamically configured. MIMO transmissions with precoding may also be supported, as may multi-layer transmissions. Aggregation of multiple cells may be supported.

FIG. 1 illustrates an example wireless communication network 100 in which aspects of the present disclosure may be performed. For example, the wireless communication network 100 may be an NR system (e.g., a 5G NR network), an Evolved Universal Terrestrial Radio Access (E-UTRA) system (e.g., a 4G network), a Universal Mobile Telecommunications System (UMTS) (e.g., a 2G/3G network), or a code division multiple access (CDMA) system (e.g., a 2G/3G network), or may be configured for communications according to an IEEE standard such as one or more of the 802.11 standards, etc. As shown in FIG. 1, a UE 120a includes a proximity detector 122 that provides various object detections, for example using perturbations in a model of a channel between antennas over time, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell," which may be stationary or may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
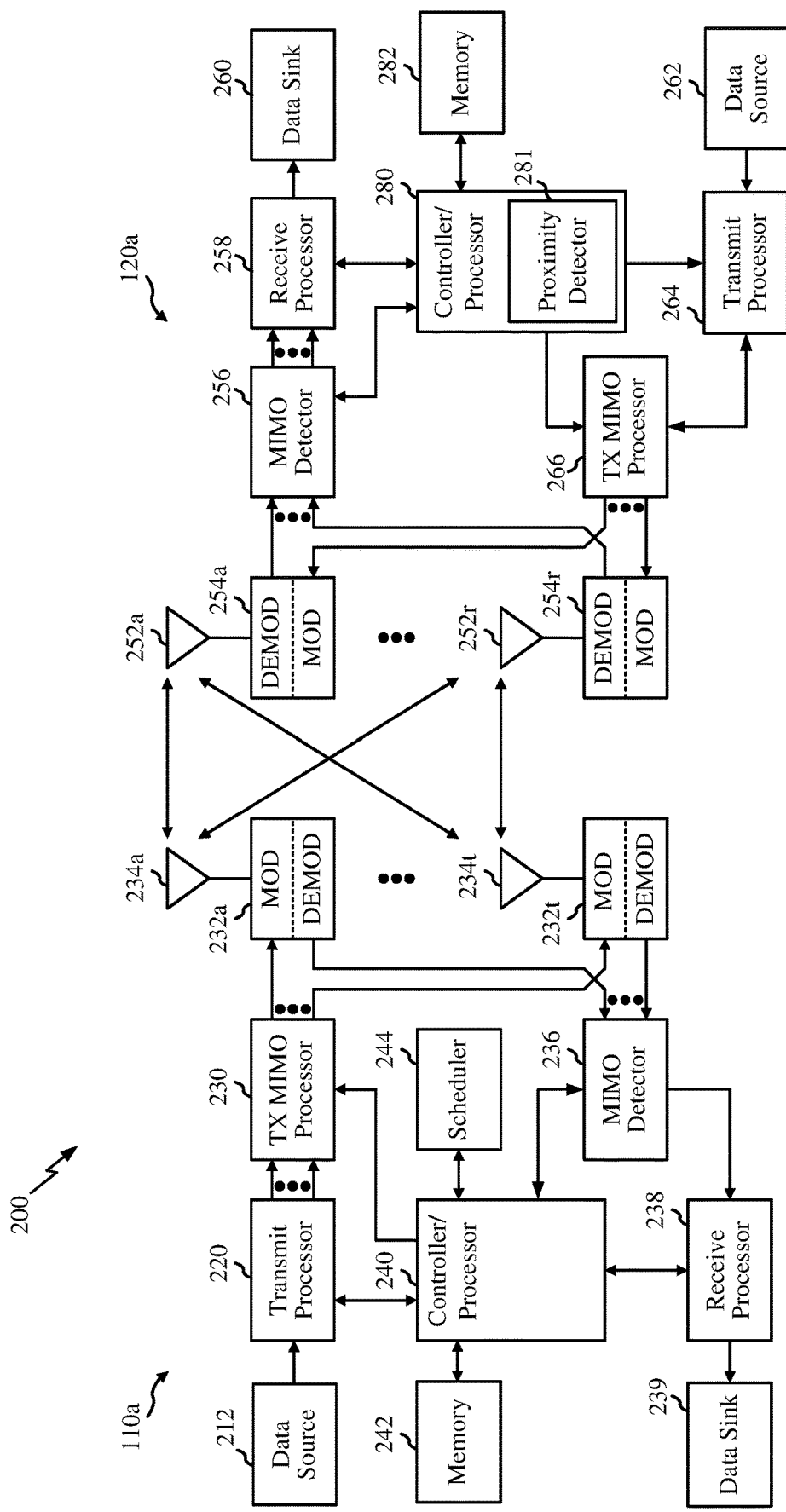
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for single-carrier frequency division multiplexing (SC-FDM), etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has a proximity detector 281 configured to detect objects, according to aspects described herein. In some aspects, the proximity detector 281 is configured to detect objects using perturbations in a model of a channel between antennas (such as the antenna 252a and antenna 252r) over time. Although shown at the controller/processor 280, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RB s).

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In certain aspects, the BS 110a illustrated in FIG. 2 and described above is an example of another UE 120.

Example RF Transceiver

Figure 3:
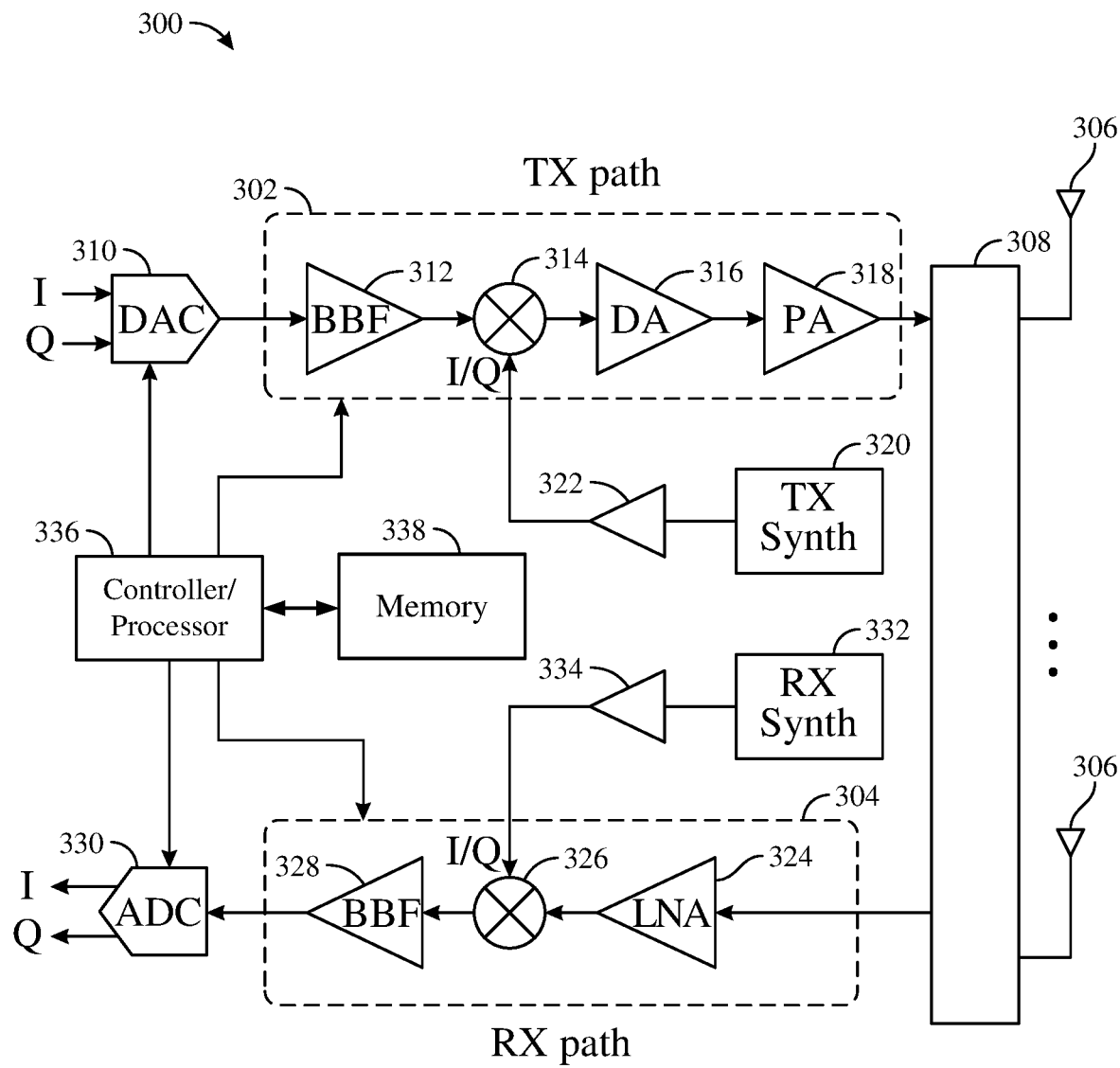
FIG. 3 is a block diagram of an example radio frequency (RF) transceiver, in accordance with certain aspects of the present disclosure.

FIG. 3 is a block diagram of an example RF transceiver circuit 300, in accordance with certain aspects of the present disclosure. The RF transceiver circuit 300 may be an example of one or more of the transceivers 254, and includes at least one transmit (TX) path 302 (also known as a transmit chain) for transmitting signals via one or more antennas 306 and at least one receive (RX) path 304 (also known as a receive chain) for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like. The antenna 306 may be an example of one or more of the antennas 252.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, the DA 316, and the PA 318 may be included in one or more radio frequency integrated circuits (RFICs).

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC(s) that include the TX path components. RF signals received via the antenna 306 may be amplified by the LNA 324, and the mixer 326 mixes the amplified RF signals with a receive local oscillator (LO) signal to convert the RF signal of interest to a baseband frequency (e.g., downconvert). The baseband signals output by the mixer 326 may be filtered by the BBF 328 before being converted by an analog-to-digital converter (ADC) 330 to digital I or Q signals for digital signal processing. While one mixer 326 is illustrated, multiple mixers may be used to downconvert the amplified RF signals to one or more intermediate frequencies and to thereafter downconvert the intermediate frequency signals to baseband.

Certain transceivers may employ frequency synthesizers, for example, with a voltage-controlled oscillator (VCO) to generate a stable, tunable LO with a particular tuning range. In certain cases, the transmit LO may be produced by a TX frequency synthesizer 320, which may be buffered or amplified by an amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326.

A controller 336 may direct the operation of the RF transceiver circuit 300, such as transmitting signals via the TX path 302 and/or receiving signals via the RX path 304. In aspects, the controller 336 may detect the presence, proximity (e.g., distance), or location of an object relative to the RF transceiver circuit 300 as further described herein with respect to FIG. 5. The controller 336 may be implemented by a processor (e.g., a digital signal processor (DSP)), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 may be included in the controller/processor 280, or may be implemented separate therefrom. Similarly, the memory 338 may be included in the memory 282, or may be implemented separate therefrom.

Example RF Exposure Limit

Exposure limits are imposed to limit RF radiation from wireless devices. For example, a specific absorption rate (SAR) limit may be imposed for wireless devices communicating in a sub-6 GHz carrier (e.g., communicating in a spectrum at or below 6 GHz). The transmission in a sub-6 GHz carrier system may be close to isotropic and may have a low path loss. The SAR regulatory metric for exposure is a volume metric, e.g., expressed as a power per unit volume. SAR may be used to assess RF exposure for transmission frequencies less than 6 GHz, which cover wireless communication technologies such as 2G/3G (e.g., CDMA), 4G (e.g., LTE), 5G (e.g., NR in 6 GHz bands), IEEE 802.11ac, etc.

A maximum permissible exposure (MPE) limit may be imposed for wireless devices communicating above 6 GHz. The MPE limit is a regulatory metric for exposure based on area, e.g., an energy density limit defined as a number, X, watts per square meter ($W/m^2$) averaged over a defined area and time-averaged over a frequency dependent time window in order to prevent a human exposure hazard represented by a tissue temperature change. In certain cases, the MPE limit may include a power density (PD), and the PD may be used to assess RF exposure for transmission frequencies higher than 10 GHz, which cover wireless communication technologies such as IEEE 802.11ad, 802.11ay, 5G in mmWave bands, etc. Different metrics may be used to assess RF exposure for different wireless communication technologies.

The higher frequencies above 6 GHz interact with a person's skin surface, while the lower frequencies below 6 GHz can be absorbed in volume. An exposure limitation may be indicated for whole body exposure and/or for localized exposure. Exposure limits may be based on an average amount of exposure for a defined time window. An example MPE limit for mmWave systems (such as 24 GHz-60 GHz bands) is 10 $W/m^2$ over 4 $cm^2$. Thus, this limit may indicate that a power density hitting a person shall not exceed 10 $W/m^2$. Another example limit may be 10 $W/m^2$ over 20 $cm^2$, e.g., in which the power density needs to be met over a wider area. For a UE, an average MPE measurement may be used, e.g., using a duty cycle.

Figure 4:
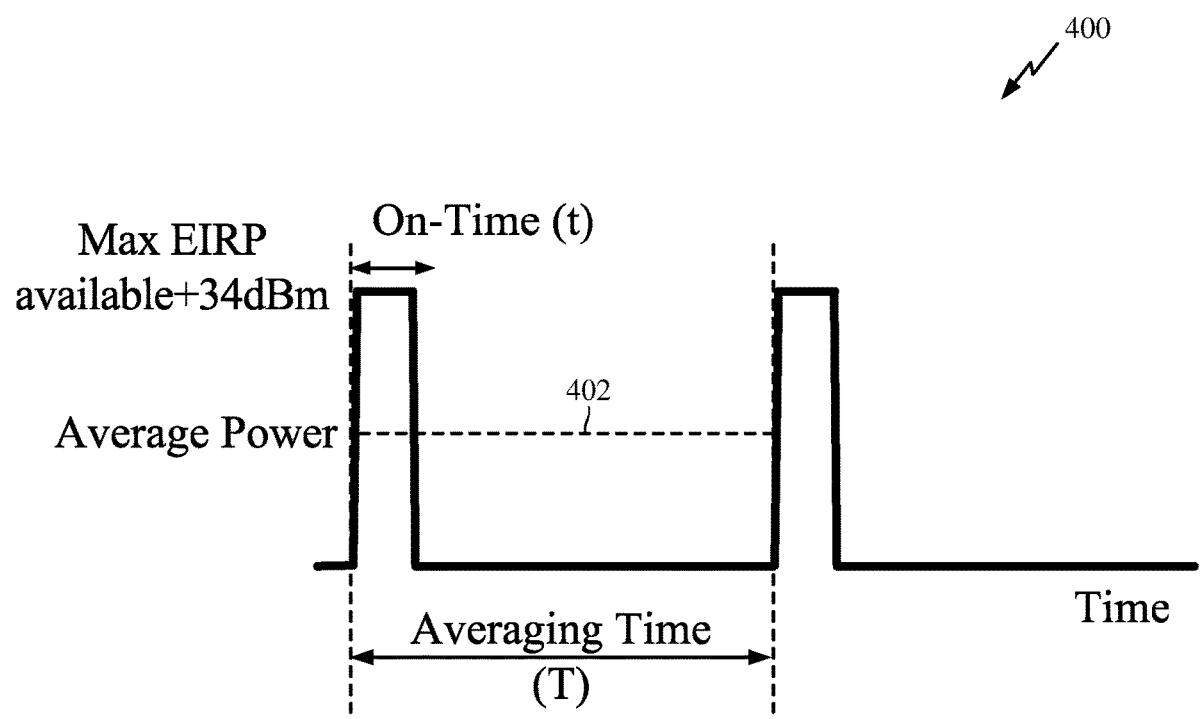
FIG. 4 is a graph illustrating an example of averaging transmit power in compliance with an RF exposure limit, in accordance with certain aspects of the present disclosure.

FIG. 4 illustrates an example plot 400 of averaging exposure for a transmission during a time, t, that is only a portion of the averaging time window, T, which may be associated with an RF exposure limit. The transmission may be transmitted at a maximum effective isotropic radiated power (max EIRP) of +x dBm and will lead to the indicated average power 402 when averaged over the averaging time window T. This allows the UE to transmit at max EIRP of +x dBm for a short period of time within the averaging window so that the average power over the averaging window will be less than the max EIRP.

In order to ensure that the UE maintains conformance with exposure limits while providing an effective range, a UE may perform exposure measurements to detect actual exposure conditions. When the UE determines a problematic exposure condition, the UE may respond in any of a variety of ways to ensure conformance with the exposure limits. The UE may reduce transmission power and/or switch antenna configurations (e.g., change antenna arrays) in response to detecting an exposure condition that would violate the limit.

The UE may perform an in-band exposure measurement, e.g., an MPE measurement, to detect the presence of a person, e.g., a hand or other body part in a particular beam direction. One example of an MPE measurement may be made using a frequency-modulated continuous wave radar measurement. Other examples may include a chirp, a single tone, or a series of individual tones, etc. For example, the UE may transmit a radio signal with at least one antenna element, and the receiver may detect reflections from objects in the path of the signal. This detection may enable the UE to detect an obstruction and a distance to the obstruction. The UE may respond based on the assumption, or based on a determination, that the obstruction is a portion of a person's body in the path of a transmission from the antenna. Example detection methods include cross-polarization (x-pol) and radar. In the radar example, the radar signal may sweep the signal in frequency over a wide bandwidth and may radiate in the band in which the UE will communicate with a base station. In the x-pol example, the transmission may include only a single tone rather than a wideband signal.

Example Proximity Detection

Aspects of the present disclosure provide various techniques for proximity detection, such as based on perturbations in a model of a channel over time. For example, the UE can determine the proximity of a nearby object based on a non-linear single-tap or multi-tap model (such as a Volterra series) of the channel over time. In aspects, the proximity of the object may be used in various applications. For example, the techniques for proximity detection described herein may be used in adjusting the transmission power for compliance with RF exposure limits, responding to the movement of objects (such as interactive hand or finger gestures), detecting room activity, mapping a room, or supplementing location services. As RF exposure requirements limit transmission at higher powers for prolonged periods of time, the proximity detection techniques described herein may allow for desirable transmission power and desirable data rates. For example, human proximity to the UE may manifest itself in the form of channel perturbation in a dual antenna scenario, and the UE may adjust its transmit power based on the channel perturbations indicative of human proximity.

Figure 5:
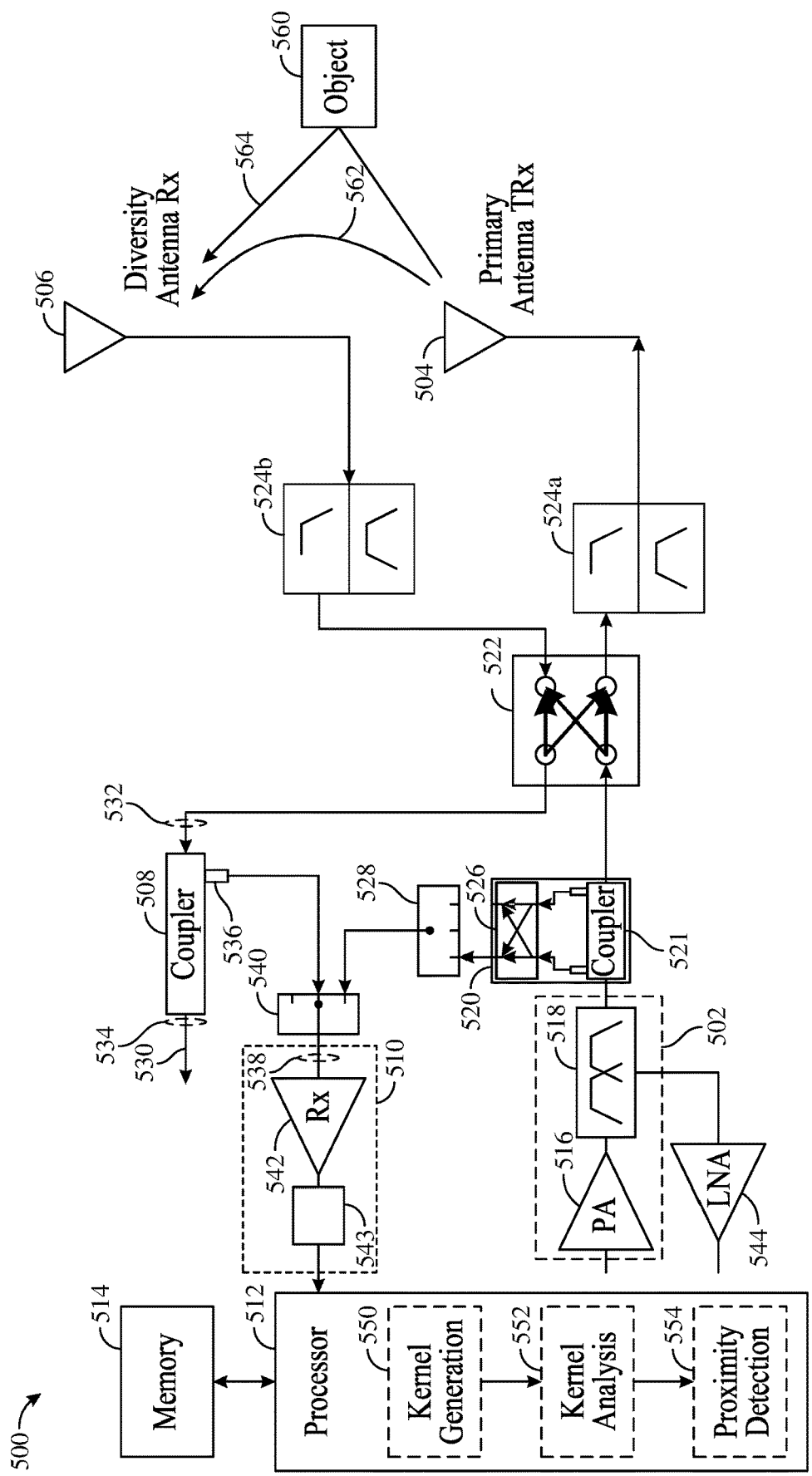
FIG. 5 is a diagram illustrating example proximity detection circuitry, in accordance with certain aspects of the present disclosure.

FIG. 5 is a diagram illustrating an example proximity detection circuitry 500, in accordance with certain aspects of the present disclosure. In aspects, the proximity detection circuitry 500 may be included in a portable apparatus for wireless communication, such as a UE (e.g., the UE 120a) or other portable wireless communication device. For example, the proximity detection circuitry 500 may be implemented in a mobile phone, smartphone, smart watch, digital camera, tablet computer, laptop computer, etc. In certain aspects, the proximity detection circuitry 500 may be implemented at least partially with an RF transceiver, such as the RF transceiver circuit 300. In other words, a portable apparatus (such as a mobile phone, smartphone, smart watch, digital camera, tablet computer, laptop computer, etc.) may include the proximity detection circuitry 500, such as one or more of the components in the RF transceiver circuit 300.

As shown, the proximity detection circuitry 500 includes a transmit path 502, a primary antenna 504, a secondary antenna 506, an RF coupler 508, and a receive (RX) path 510 (e.g., which may include or be implemented with a feedback receiver (FBRx)). In aspects, the proximity detection circuitry 500 may further include a processor 512 and a memory 514, which is coupled to the processor 512. The transmit path 502 may be an example of the TX path 302, and the antennas 504, 506 may be examples of antennas 306 and/or 252.

In this example, the transmit path 502 may include a power amplifier (PA) 516 (e.g., the PA 318 as depicted in FIG. 3) and a first filter 518. The transmit path 502 may be coupled to the primary antenna 504 and configured to output a transmit signal for transmission via the primary antenna 504. For example, RF signals may be amplified by the PA 516 and output to the first filter 518, which may bandpass filter the amplified RF signals. The proximity detection circuitry 500 may further include coupler circuitry 520, an RF switch 522, and second filters 524a, 524b (collectively referred to as the "second filters 524"). The first filter 518 may be coupled to the coupler circuitry 520. In aspects, the first filter 518 may be a duplexer coupled to a receive path, for example, including a low-noise amplifier (LNA) 544 (such as the LNA 324).

It should be appreciated that the transmit path 502 depicted in FIG. 5 is merely an example to facilitate understanding; aspects of the present disclosure may also be applied to other suitable transmit path circuitry coupled to a primary antenna and a secondary antenna. For example, the transmit path 502 may include the PA 516 without the first filter 518.

In certain aspects, the coupler circuitry 520 may be coupled to the transmit path 502, and the coupler circuitry 520 may be used to selectively couple the transmit path 502 to the receive path 510, for example, in an internal feedback mode as further described herein. The coupler circuitry 520 may include an RF coupler 521 and an RF switch 526, which may be selectively coupled to the receive path 510, for example, via a multiplexer 528. In some embodiments, the multiplexer 528 is omitted, and the coupler circuitry 520 is directly coupled to the receive path 510 (or to a multiplexer 540, described below). The RF switch 526 may be implemented by a double-pole, double-throw (DPDT) switch, or a single-pole, double-throw (SPDT) switch in some configurations. In aspects, the multiplexer 528 may be a switch having a first input, a second input, and an output (e.g., an SPDT switch). The RF switch 526 of the coupler circuitry 520 may enable coupling between the PA 516 and the receive path 510 or coupling between the receive path 510 and the primary antenna 504 and/or secondary antenna 506, such that transmit signals may pass through the RF switch 526 from the PA 516 to the receive path 510, or receive signals may pass through the RF switch 526 from the primary antenna 504 and/or secondary antenna 506 to the receive path 510. In certain cases, the coupler circuitry 520 may serve as part of a feedback receive path for another PA. For example, the other PA and another antenna (not shown) could be configured for transmission, and the coupler circuitry 520 and the path to the primary antenna 504 could be configured for reception, assuming that the PA 516 is turned off or disabled.

The RF switch 522 may be coupled to the coupler circuitry 520, the RF coupler 508, and the primary and secondary antennas 504, 506 via the second filters 524. The RF switch 522 may enable coupling between the PA 516 and the primary antenna 504 and coupling between the RF coupler 508 and the secondary antenna 506, such that transmit signals pass through the RF switch 522 from the PA 516 to the primary antenna 504, and receive signals pass through the RF switch 522 from the secondary antenna 506 to the RF coupler 508. In aspects, the transmit signals and receive signals may concurrently pass through the RF switch 522. In other aspects, the RF switch 522 is omitted, and the antennas 504, 506 are separately and respectively coupled to the couplers 521, 508.

The additional receive path including the LNA 544 is a separate receive path from the receive path 510. In some embodiments, the receive path 50 may be used for calibration of one or more transmit paths (e.g., the transmit path 502) or processing of object detection or ranging signals. The additional receive path with the LNA 544 may be used for processing signals received from one of the antennas (e.g., antennas 504, 506) that includes user or control data (e.g., from a wireless network with which the portable apparatus is communicating) and may be implemented similarly to receive path 304, for example. In such embodiments, a mixer in the additional receive path may receive an LO signal from the synthesizer 332 (as described above), and the LO may be configured to oscillate substantially at a receive frequency for the wireless network.

The second filter 524a may be coupled between the RF switch 522 and the primary antenna 504, and the second filter 524b may be coupled between the RF switch 522 and the secondary antenna 506. The second filters 524 may include a bandpass filter and/or a low pass filter.

The primary antenna 504 may include one or more antennas, such as an antenna array and/or an antenna module. Similarly, the secondary antenna 506 may include one or more antennas, such as an antenna array and/or an antenna module.

In certain aspects, the proximity detection circuitry 500 may include a diversity path 530 coupled to the RF coupler 508. For example, the secondary antenna 506 may function as a diversity antenna, and the RF coupler 508 may operate as a diversity coupler coupled to the diversity path 530 and selectively coupled to the receive path 510. For example, the RF coupler 508 may be coupled to the receive path 510 when the proximity detection circuitry 500 is operated in an object detection mode, as described below. The diversity path 530 may provide a separate point in which to process and/or analyze the receive signals captured via the primary antenna 504 and/or secondary antenna 506. The diversity path 530 may include similar components as another receive path, such as the receive path 304, and may be configured to process user or control data (e.g., from a wireless network with which the portable apparatus is communicating). In some such embodiments, a mixer in the diversity path 530 may receive an LO signal from the synthesizer 332 (as described above), and the LO may be configured to oscillate substantially at a receive frequency for the wireless network.

The RF coupler 508 may be coupled to the secondary antenna 506, for example, through the RF switch 522. The RF coupler 508 may facilitate coupling between the receive path 510 and the secondary antenna 506 and enable sensing of the transmit path and/or any channel perturbations due to the presence of the object in the object detection mode. In some embodiments, the RF coupler 508 may comprise a T-junction (e.g., a three-port coupler having an input and two outputs) having a first port 532, a second port 534, and a third port 536. The first port 532 of the RF coupler 508 may be coupled to the secondary antenna 506. The second port 534 of the RF coupler 508 may be coupled to the diversity path 530. The third port 536 of the RF coupler 508 may be selectively coupled to the receive path 510. In some embodiments, the RF coupler 508 may include circuitry similar to the coupler circuitry 520 and/or the RF coupler 521.

The receive path 510 may have an input 538 selectively coupled between the transmit path 502 (in the internal feedback mode) and the RF coupler 508 (in the object detection mode) such that when the receive path 510 is coupled to the RF coupler 508 and configured to operate concurrently with the transmit path 502, the receive path 510 is configured to receive, for example, a reflected portion of the transmit signal from an object 560 located in proximity to the proximity detection circuitry 500 (e.g., in proximity to the primary and secondary antennas 504, 506). In certain cases, the signals received via the receive path 510 may be indicative of any perturbation of the channel due to the presence of the object 560, such as perturbations from loading effects of the object 560 and/or signals that might pass through the object 560. In aspects, the receive path 510 may include or be implemented with a feedback receiver (FBRx).

While the receive path 510 may be used for processing signals from the secondary antenna 506 (or from another antenna, such as the primary antenna 504), such as in the object detection mode, the receive path 510 may be configured in other instances as calibration circuitry for monitoring and calibrating the signals produced by the transmit path 502 and output by the PA 516, such as in the internal feedback mode. For example, the receive path 510 may include a mixer (e.g., as illustrated with respect to the receive path 304). In some embodiments (e.g., when the receive path is configured as a FBRx), the mixer may be coupled to the TX frequency synthesizer 320 or TX LO instead of being coupled to an RX synthesizer or LO. The TX frequency synthesizer may be the same synthesizer that is coupled to the transmit path 502 or configured similar thereto. In some embodiments, the synthesizer 320 may be configured to selectively generate an oscillating signal (e.g., substantially at a transmit frequency for a wireless network with which the portable apparatus is communicating) for data transmission and an object detection signal (for example, by continuously modulating a frequency, or to generate a chirp or series of individual tones, etc. as described above). In other embodiments, separate synthesizers are used to generate the oscillating signal for data transmission and the object detection signal. In some such embodiments, the transmit path and/or the receive path 510 may include circuitry to select between the different synthesizers. In the internal feedback mode, both the transmit path 502 and the receive path 510 may be coupled to a synthesizer configured to generate an oscillating signal. In the object detection mode, both the transmit path 502 and the receive path 510 may be coupled to a synthesizer configured to generate an object detection signal.

In certain aspects, a multiplexer 540 may be coupled between the RF coupler 508 and the receive path 510. The receive path 510 may include an amplifier 542 and other circuitry 543 (e.g., for additional signal processing, such as downconverting (e.g., using the mixer described above), filtering, etc.). The multiplexer 540 may have separate inputs coupled to the RF coupler 508 and the transmit path 502, for example, via the coupler circuitry 520 and the multiplexer 528. The multiplexer 540 may enable the selective coupling of the input 538 between the transmit path 502 and the RF coupler 508. In aspects, the multiplexer 540 may be a switch having a first input, a second input, and an output (e.g., a single-pole, double-throw (SPDT) switch). The first input of the multiplexer 540 may be coupled to the coupler circuitry 520, the second input of the multiplexer 540 may be coupled to the RF coupler 508, and an output of the multiplexer 540 may be coupled to the input 538 of the receive path 510. In aspects, the multiplexer 528 and/or the multiplexer 540 may be used to isolate the transmit path 502 from the receive path 510 when proximity detection is being performed. For example, when the proximity detection circuitry 500 is enabled to feed receive signals to the receive path 510, the multiplexer 528 and/or the multiplexer 540 may disconnect or decouple the transmit path 502 from the receive path 510.

The amplifier 542 may have an input coupled to the output of the multiplexer 540 and have an output coupled to the processor 512. In aspects, the amplifier 542 may be an LNA. The other circuitry 543 may downconvert, filter, and digitize the received signal, for example, as described herein with respect to the receive path 304 and ADC 330 of FIG. 3.

The processor 512 may include an application processor, a modem, a central processing unit (CPU), a DSP, an ASIC, an FPGA or other PLD, discrete gate or transistor logic, discrete hardware components, or any combination thereof. In aspects, the processor 512 may be implemented by the controller 336 of FIG. 3 and/or any of the other processors described herein with respect to FIG. 2. The memory 514 may store data and program codes for operating the various object detection techniques. In aspects, the memory 514 may be implemented by the memory 338 and/or memory 282.

The processor 512 and the memory 514 may enable the receive path 510 to operate in separate modes, such as the object detection mode or the internal feedback mode (also referred to as a calibration mode). For example, the processor 512 and the memory 514 may select when to operate the receive path 510 in the object detection mode or the internal feedback mode and send control signals to the multiplexers (e.g., multiplexers 528, 540), switches (e.g., switches 522, 526), and/or other selection circuitry. The processor 512 and memory 514 may also send control signals which determine an output of a synthesizer (e.g., the TX frequency synthesizer 320) and/or which synthesizer(s) to couple to the transmit path 502 and/or receive path 510.

In the internal feedback mode, the proximity detection circuitry 500 may monitor the signal output by the PA 516 with the receive path 510, for example, for closed-loop feedback in adjusting digital pre-distortion circuitry (not shown) coupled to the transmit path 502 (e.g., to the PA 516). In certain cases, the internal feedback mode may be used to monitor the transmit power output by the PA 516. The proximity detection circuitry 500 may allow the signal output by the PA 516 to pass through the coupler circuitry 520 and the multiplexer 528 to the receive path 510 without any input from the secondary antenna 506. In other words, the proximity detection circuitry 500 may not use the RF coupler 508 in the internal feedback mode.

In the object detection mode, the proximity detection circuitry 500 may be configured to detect the presence of an object. For example, the proximity detection circuitry 500 may allow for received signals from the secondary antenna 506 to pass through the RF coupler 508 to the receive path 510 for proximity detection. In certain aspects, the processor 512 and the memory 514 may be configured to operate the proximity detection circuitry 500 in the object detection mode, which includes the receive path 510 being coupled to the RF coupler 508 (e.g., via the multiplexer 540), operating concurrently with the transmit path 502 (e.g., while the transmit path 502 is outputting a transmit signal), and receiving a reflected portion of the transmit signal from the object 560 located in proximity to the proximity detection circuitry 500. In some embodiments, the processor 512 may be configured to detect the presence of an object based at least in part on a model of a channel between the primary antenna 504 and the secondary antenna 506.

In aspects, the proximity detection circuitry 500 may determine the proximity of the object 560 to the portable apparatus using a model of a channel between the primary antenna 504 and the secondary antenna 506. For example, the processor 512 and memory 514 may be configured to obtain one or more signals indicative of mutual coupling 562 between the primary antenna 504 and the secondary antenna 506, indicative of reflections 564 from the object 560, and/or indicative of any perturbations of the channel, such as loading effects and/or effects of the transmit signal passing through the object 560. The mutual coupling 562 may be indicative of the transmit signals output for transmission via the primary antenna 504 and reaching the secondary antenna 506 without any object present, and the reflections 564 and/or perturbations of the channel may be indicative of the presence, proximity, distance, or location associated with the object 560.

The processor 512 and memory 514 may be configured to detect a presence of the object 560 within a range of the portable apparatus based at least in part on a model of a channel between the primary antenna 504 and the secondary antenna 506 generated using the signals. For presence detection, the range may be an RF coverage area of the primary antenna 504 and/or a range of reception of the secondary antenna 506. In aspects, the model of the channel between the primary antenna 504 and the secondary antenna 506 may be used to detect the proximity of the object 560 to the portable apparatus (e.g., the distance of the object 560 to the portable apparatus) and/or location of the object 560 relative to the portable apparatus. In aspects, the location of the object 560 may be represented based on an azimuth, elevation, and distance relative to the portable apparatus.

In aspects, the various detections associated with the object (e.g., presence, distance, or location) may be detected based on changes in magnitude (or amplitude) and/or phase of the signals. For example, the processor 512 and memory 514 may be configured to determine a change in magnitude of the signals based on the model of the channel and detect the presence of the object based at least in part on the change in magnitude. In certain cases, the processor 512 and memory 514 may be configured to determine a change in phase of the signals based on the model of the channel and detect the presence of the object based at least in part on the change in phase, for example, as described herein with respect to FIG. 6A. In aspects, the processor 512 and memory 514 may be configured to determine a change in magnitude of the one or more signals based on the model of the channel, determine a change in phase of the one or more signals based on the model of the channel, and detect the presence of the object based at least in part on the change in phase and the change in magnitude.

In aspects, the model of the channel may include a non-linear single-tap or multi-tap model. The model of the channel may use linear or non-linear modelling with memory for either linear and/or non-linear terms. For example, the model of the channel may include a Volterra model, such as a Volterra series modeling the non-linear behavior of the channel between the primary antenna 504 and the secondary antenna 506. The Volterra model may include at least one of linear memory kernels or non-linear memory kernels. In aspects, the Volterra modelling may be accessible through a Volterra-based kernel set, which, for example, may also be used for digital pre-distortion of an amplifier input (e.g., the PA 516). The processor 512 and memory 514 may be configured to determine kernels for the Volterra model using a regression such as a linear regression. The processor 512 and memory 514 may be configured to determine a distance between the object 560 and the portable apparatus based at least in part on the Volterra model.

As an example of the channel modeling, at block 550, the processor 512 may generate kernel coefficients associated with a Volterra model of the channel between the primary antenna 504 and the secondary antenna 506. At block 552, the processor 512 may analyze the kernel coefficients generated for the Volterra model, such as determining changes in magnitude and/or phase of the received signals based on the Volterra kernel coefficients. At block 554, the processor 512 may detect the presence of the object, the distance to the object, and/or the location of the object based on the kernel analysis. The processor 512 may include or receive input from an analog-to-digital converter (ADC) configured to take digital samples of the signals from the receive path 510. The sample captures may then be processed using Volterra kernels to model amplitude/phase change of the mutually coupled signal and/or amplitude/phase change of reflected signals. In certain cases, a single-tap complex regression may be used to derive magnitude/amplitude and phase delta of the mutually coupled signal.

In aspects, the various detections associated with the object (e.g., presence, distance, or location) may be used in various applications such as RF exposure limit compliance, responding to the movement of objects (such as interactive hand or finger gestures), detecting room activity, mapping a room, or supplementing location services. In certain cases, the processor 512 and memory 514 may be configured to determine a transmission power level based on the detected presence (or distance or location) of the object and an RF exposure limit associated with the detected presence, and the transmit path is configured to output another transmit signal for transmission at the transmission power level. For example, the processor may detect that the object is in close proximity to the wireless communication device and implement the RF exposure limits for when a human is in close proximity to the wireless communication device under the assumption that the object is a human or based on a determination that the object is human or likely living. The processor may detect that the object is not in close proximity to the wireless communication device allowing the wireless communication device to transmit at higher power levels within the RF exposure limits. In aspects, the RF exposure limit may be based on at least one of a SAR or a PD.

In aspects, the proximity detection circuitry 500 may perform the various detections dynamically or on a periodic basis. For example, the proximity detection circuitry 500 may transmit the transmit signals to perform the various detections during a measurement gap within a specific periodicity, such as periodicities of 20, 40, 80, or 160 ms. In certain cases, the proximity detection circuitry 500 may perform the various detections on a dynamic basis, such as in response to higher layer applications.

While FIG. 5 provides example applications (such as an RF transceiver and/or a wireless communication device) in which certain aspects of the present disclosure may be implemented to facilitate understanding, certain aspects described herein related to the proximity detection circuitry may be utilized in other suitable electronic systems and/or circuits.

Figure 6A:
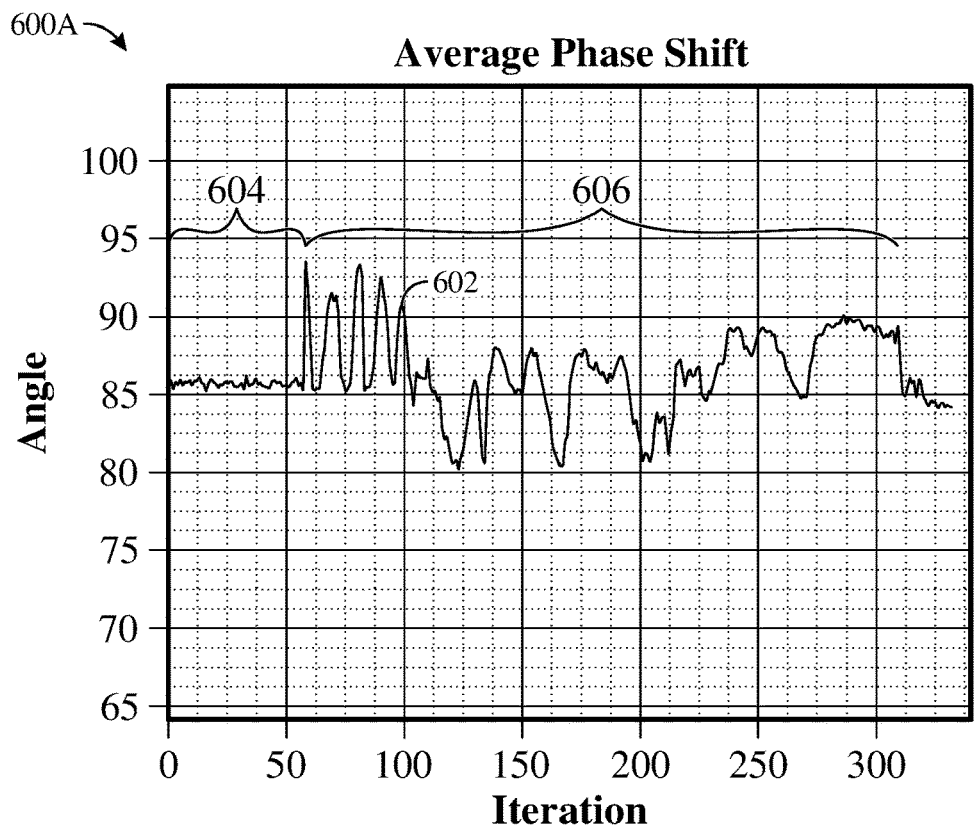
FIG. 6A is a graph illustrating an average change in phase of received signals with time, in accordance with certain aspects of the present disclosure.

FIG. 6A is a graph 600A illustrating an average change in phase of received signals over time, in accordance with certain aspects of the present disclosure. As shown, the curve 602 represents a phase delta of the mutually coupled signal and any reflected signals over channel model iterations, which are indicative of separate points in time. In a first region 604, when there is no object proximate to the wireless communication device, the phase value of the curve 602 is relatively constant at about 86 degrees. In a second region 606, when an object (such as a hand) is waved proximate to (e.g., within 5 centimeters) of the wireless communication device, the phase value of the curve 602 is volatile ranging between about 80 degrees and 94 degrees. The graph 600A demonstrates that a change in phase of the received signals may indicate the presence and/or proximity of an object. In other words, perturbations in a model of a channel over time according to the received signals may be indicative of the presence and/or proximity of the object.

Figure 6B:
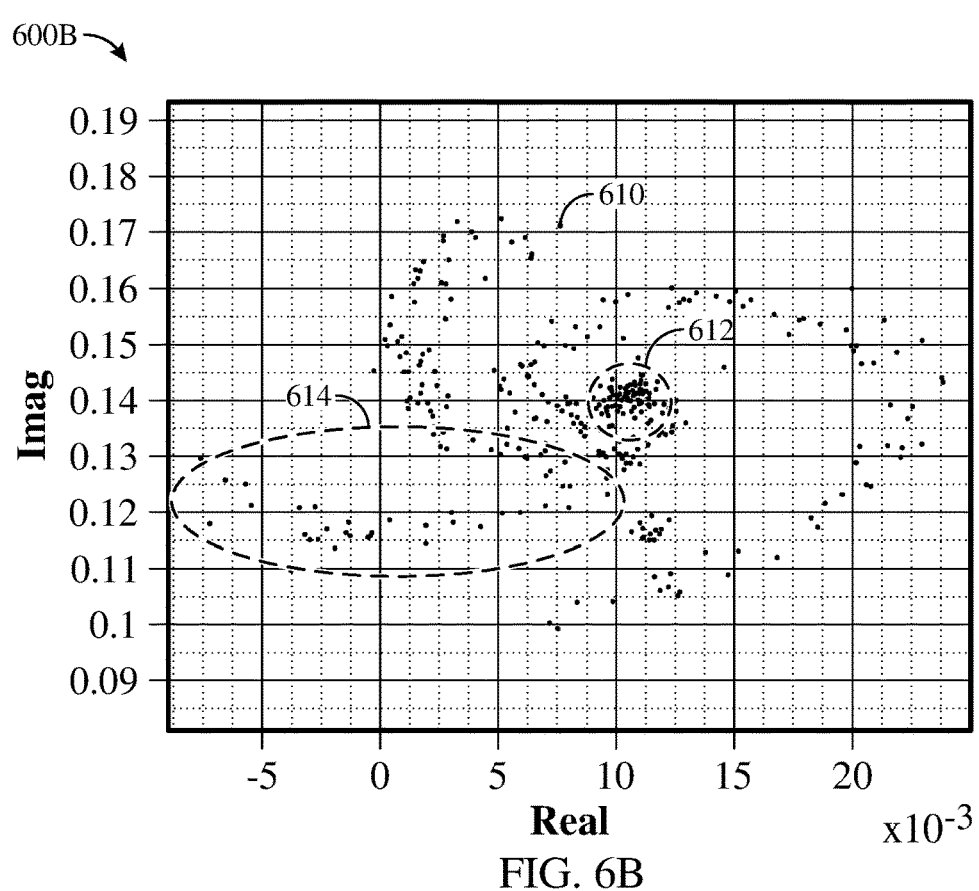
FIG. 6B is a graph illustrating a complex representation of the magnitude and phase associated with received signals, in accordance with certain aspects of the present disclosure.

FIG. 6B is a graph 600B illustrating a complex representation (e.g., using real and imaginary or I/Q components) of the magnitude and phase associated with received signals, in accordance with certain aspects of the present disclosure. For example, each dot (e.g., the dot 610) may represent the magnitude and phase associated with a received signal at a particular iteration (e.g., when the object is placed in a particular location around the wireless communication device). In the first cluster 612, the magnitudes represented by each dot have relatively similar values and the phases represented by each dot have relatively similar values when the object is not proximate to the wireless communication device. In other words, the magnitude and phase begins to represent free/open space (e.g., may be represented by a dot within an area occupied by the first cluster 612) as the object gets further away from the wireless communication device. In the second cluster 614, a trajectory of the dots (e.g., as the dots get closer to the first cluster 612) may indicate that the object is in a particular location (e.g., distance, azimuth, and elevation) relative to the wireless communication device. Outside of the first cluster 612, the illustrated complex values (or the magnitude and phase which they represent) may provide an indication of the location of the object, for example, with respect to distance, azimuth, and elevation. In other words, each trajectory outside of the first cluster 612 may represent a different azimuth and elevation in space around the wireless communication device. The graph 600B demonstrates that the change in magnitude and phase may indicate the location of the object.

Figure 7A:
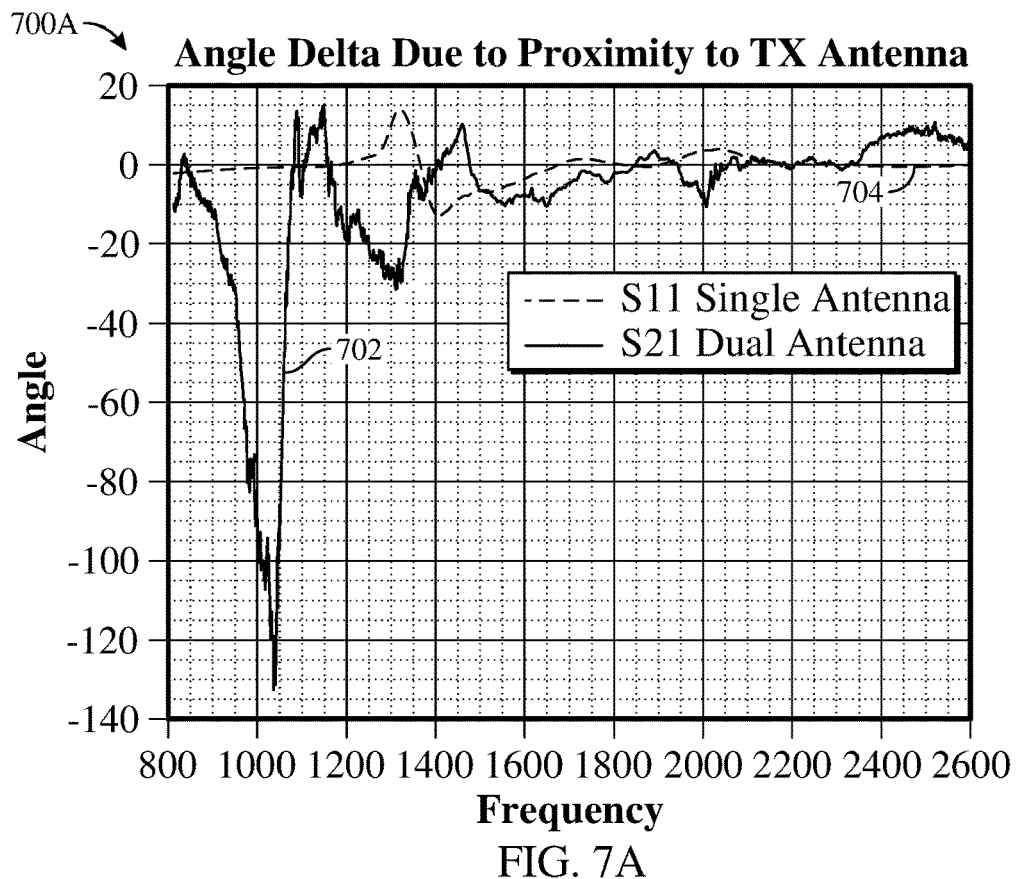
FIG. 7A is a graph illustrating a scattering parameter phase angle delta due to an object's proximity to a transmit antenna over frequency, in accordance with certain aspects of the present disclosure.

FIG. 7A is a graph 700A illustrating an S-parameter phase angle delta due to an object's proximity to a transmit antenna (e.g., the primary antenna 504) over frequency, in accordance with certain aspects of the present disclosure. As shown, the curve 702 represents the phase angle delta with respect to frequency (800 MHz to 2600 MHz) when using a dual antenna architecture (e.g., the primary antenna 504 as the transmit antenna and the secondary antenna 506 as the receive antenna) to detect the object. The curve 704 represents the phase angle delta with respect to frequency when using a single antenna architecture (e.g., the primary antenna 504 as the transmit antenna and receive antenna).

Figure 7B:
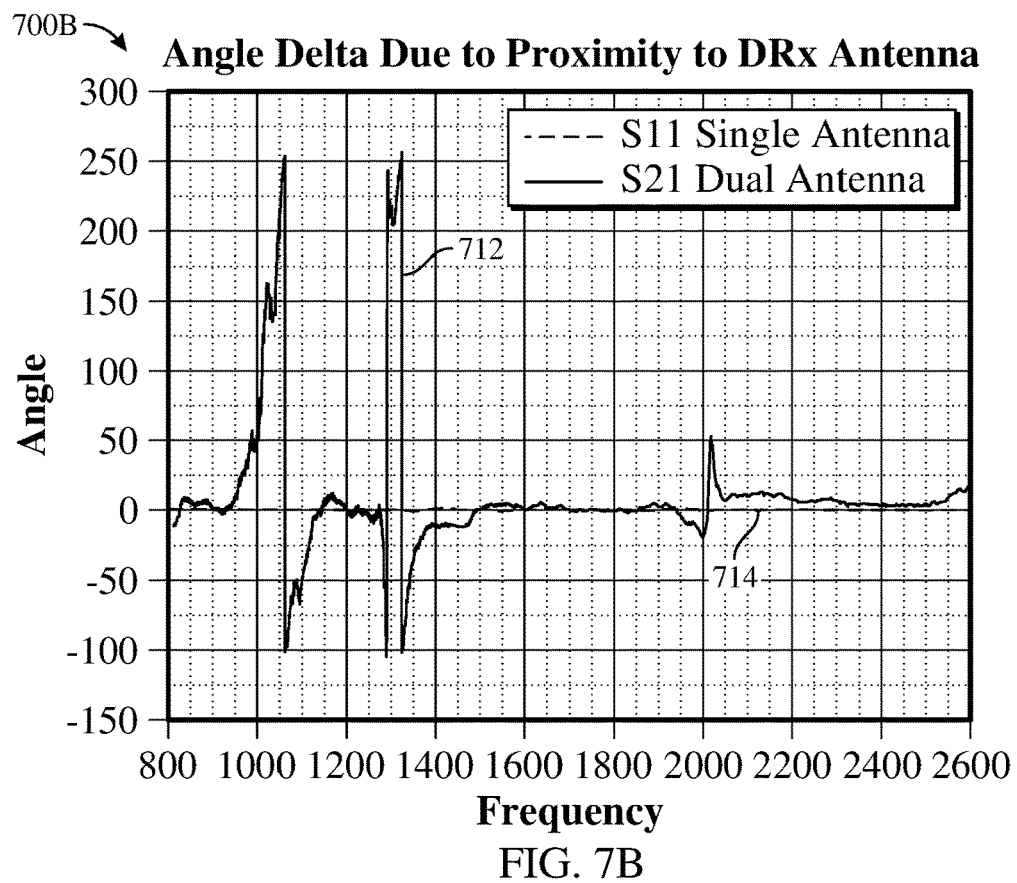
FIG. 7B is a graph illustrating a scattering parameter phase angle delta due to an object's proximity to a diversity receive (DRx) antenna over frequency, in accordance with certain aspects of the present disclosure.

FIG. 7B is a graph 700B illustrating an S-parameter phase angle delta due to an object's proximity to a diversity receive antenna (DRx) (e.g., the secondary antenna 506) over frequency, in accordance with certain aspects of the present disclosure. As shown, the curve 712 represents the phase angle delta with respect to frequency when using the dual antenna architecture to detect the object. The curve 714 represents the phase angle delta with respect to frequency when using the single antenna architecture. The curves 702, 712 demonstrate that the dual antenna architecture is sensitive to detecting object proximity to the transmit antenna and receive antenna through the phase angle delta over a wide range of frequencies (e.g., 800 MHz to 2600 MHz), whereas the curves 704, 714 demonstrate that the single antenna architecture may be sensitive to detecting the object in proximity to the transmit antenna over a smaller range of frequencies. That is, the dual antenna architecture, for example, as depicted in FIG. 5, is more sensitive and better able to detect changes in an object's proximity/location at various different frequency ranges and positions with respect to the device.

Figure 8:
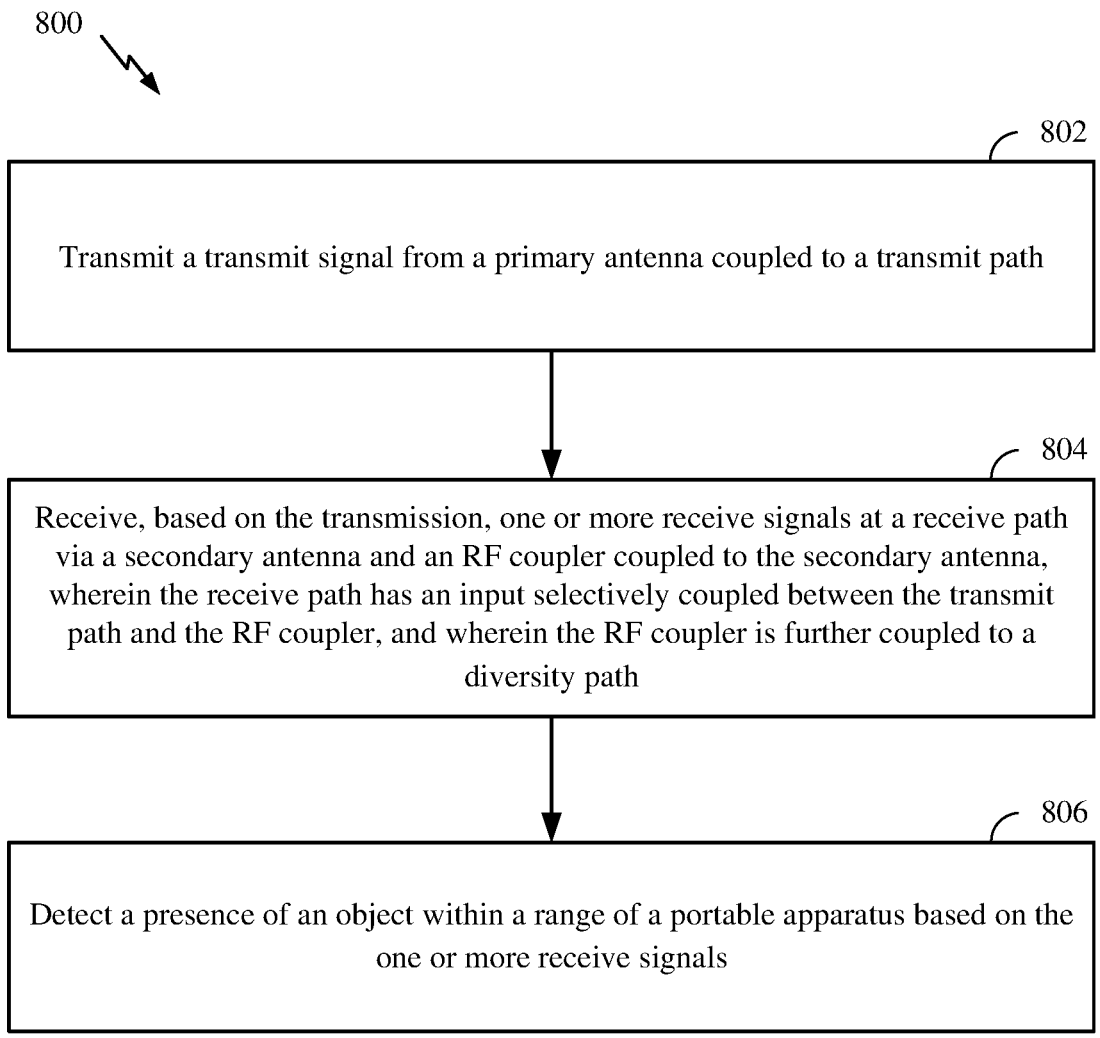
FIG. 8 is a flow diagram illustrating example operations for operating a portable apparatus, in accordance with certain aspects of the present disclosure.

FIG. 8 is a flow diagram illustrating example operations 800 for operating a portable apparatus (e.g., a UE 120 having the proximity detection circuitry 500), in accordance with certain aspects of the present disclosure.

The operations 800 may begin, at block 802, where the portable apparatus may transmit a transmit signal from a primary antenna (e.g., the primary antenna 504) coupled to a transmit path (e.g., the transmit path 502). At block 804, the portable apparatus may receive, based on the transmission, one or more receive signals at a receive path (e.g., the receive path 510) via a secondary antenna (e.g., the secondary antenna 506) and an RF coupler (e.g., the RF coupler 508) coupled to the secondary antenna. In aspects, the receive path may have an input (e.g., the input 538) selectively coupled between the transmit path and the RF coupler, for example, as described herein with respect to FIG. 5. The RF coupler may further be coupled to a diversity path (e.g., 530). At block 806, the portable apparatus may detect a presence of an object within a range of the portable apparatus based on the receive signals.

The object detection may be based on perturbations in the model of the channel over time according to the receive signals. For example, detecting the presence of the object at block 806 may include modeling the channel between the primary antenna and the secondary antenna and detecting the presence of the object based on perturbations in the model of the channel over time according to the receive signals.

In aspects, the various detections associated with the object (e.g., presence, distance, or location) may be detected based on changes in magnitude (or amplitude) and/or phase of the received signals. For example, detecting the presence of the object at block 806 may include determining a change in magnitude of the receive signals based on the model of the channel and detecting the presence of the object based at least in part on the change in magnitude. In certain cases, detecting the presence of the object at block 806 may include determining a change in phase of the receive signals based on the model of the channel and detecting the presence of the object based at least in part on the change in phase. In certain cases, the phase and magnitude may be used to detect the presence of the object. Detecting the presence of the object at block 806 may include determining a change in magnitude of the receive signals based on the model of the channel; determining a change in phase of the receive signals based on the model of the channel; and detecting the presence of the object based at least in part on the change in phase and the change in magnitude.

With respect to the operations 800, the model of the channel may include a non-linear single tap or multi-tap model, such as a Volterra model. In certain aspects, the Volterra model may include at least one of linear memory kernels or non-linear memory kernels. As an example, detecting the presence of the object at block 806 may include determining kernel coefficients for the Volterra model using a regression, which may include a linear regression. In certain cases, the operations 800 may further include determining a distance between the object and the portable apparatus, a proximity of the object to the portable apparatus, and/or a location of the object relative to the portable apparatus based at least in part on the Volterra model.

In aspects, the various detections associated with the object (e.g., presence, distance, or location) may be used in various applications, such as RF exposure limit compliance, detecting hand or finger gestures, detecting room activity, mapping a room, or supplementing location services. As an example, the operations 800 may further include determining a transmission power level based on the detected presence of the object and an RF exposure limit associated with the detected presence and transmitting another transmit signal at the transmission power level. In aspects, the RF exposure limit may be based on at least one of a SAR or a PD.

Based on the present disclosure, it should be appreciated that the object detection circuitry and methods of object detection described herein provide various advantages. For example, the UE may adjust the transmit power in compliance with RF exposure limitations based on the channel perturbations indicative of human proximity detected according to the channel models described herein. The transmit power derived by the object detection may enable desirable uplink data rates, desirable uplink signal quality, and/or desirable uplink latencies.

Example Aspects

In addition to the various aspects described above, aspects of specific combinations are within the scope of the disclosure, some of which are detailed below:

Aspect 1: A portable apparatus for wireless communication, comprising: a primary antenna; a secondary antenna; a transmit path coupled to the primary antenna and configured to output a transmit signal for transmission via the primary antenna; a first radio frequency (RF) coupler coupled to the secondary antenna; a receive path having an input selectively coupled between the transmit path and the first RF coupler; a diversity path, wherein the secondary antenna comprises a diversity antenna and wherein the first RF coupler is a diversity coupler coupled to the diversity path and selectively coupled to the receive path; a memory; and a processor coupled to the memory, the processor and the memory being configured to operate the portable apparatus in an object detection mode, which includes the receive path being coupled to the first RF coupler, being configured to operate concurrently with the transmit path, and being configured to receive a reflected portion of a transmit signal from an object located in proximity to the portable apparatus.

Aspect 2: The portable apparatus of Aspect 1, further comprising: coupler circuitry coupled to the transmit path and selectively coupled to the input of the receive path; an RF switch coupled to the coupler circuitry, the first RF coupler, and the primary and secondary antenna; a first filter coupled between the RF switch and the primary antenna; and a second filter coupled between the RF switch and the secondary antenna, wherein the transmit path includes a power amplifier coupled to a third filter.

Aspect 3: The portable apparatus of Aspect 2, further comprising: a first multiplexer having a first input coupled to the first RF coupler and having an output coupled to the input of the receive path; a second multiplexer having an input coupled to the coupler circuitry and having an output coupled to a second input of the first multiplexer; and a low noise amplifier coupled to the third filter.

Aspect 4: The portable apparatus according to any of Aspects 1-3, wherein the first RF coupler comprises a T-junction having a first port coupled to the diversity antenna, having a second port coupled to the diversity path, and having a third port selectively coupled to the receive path.

Aspect 5: The portable apparatus according to any of Aspects 1-4, further comprising: a second RF coupler coupled to the transmit path; and a switch having a first input selectively coupled to the second RF coupler, having a second input coupled to the first RF coupler, and having an output coupled to the input of the receive path.

Aspect 6: The portable apparatus according to any of Aspects 1-5, wherein the processor and the memory are configured, in the object detection mode, to: obtain one or more signals indicative of mutual coupling between the primary antenna and the secondary antenna and reflections from the object; and detect a presence of the object within a range of the portable apparatus based at least in part on a model of a channel between the primary antenna and the secondary antenna.

Aspect 7: The portable apparatus of Aspect 6, wherein the processor and the memory are further configured, in the object detection mode, to: determine a change in magnitude of the one or more signals based on the model of the channel; and detect the presence of the object based at least in part on the change in magnitude.

Aspect 8: The portable apparatus of Aspect 6, wherein the processor and the memory are further configured, in the object detection mode, to: determine a change in phase of the one or more signals based on the model of the channel; and detect the presence of the object based at least in part on the change in phase.

Aspect 9: The portable apparatus of Aspect 6, wherein the processor and the memory are further configured, in the object detection mode, to: determine a change in magnitude of the one or more signals based on the model of the channel; determine a change in phase of the one or more signals based on the model of the channel; and detect the presence of the object based at least in part on the change in phase and the change in magnitude.

Aspect 10: The portable apparatus according to any of Aspects 6-9, wherein the model of the channel includes a non-linear multi-tap model.

Aspect 11: The portable apparatus according to any of Aspects 6-10, wherein the model of the channel includes a Volterra model.

Aspect 12: The portable apparatus of Aspect 11, wherein the Volterra model includes at least one of linear memory kernels or non-linear memory kernel.

Aspect 13: The portable apparatus according to Aspect 11 or 12, wherein the processor and the memory are further configured to determine kernels for the Volterra model using a regression.

Aspect 14: The portable apparatus according to any of Aspects 11-13, wherein the processor and the memory are further configured to determine a distance between the object and the portable apparatus based at least in part on the Volterra model.

Aspect 15: The portable apparatus according to any of Aspects 6-14, wherein: the processor and the memory are further configured to determine a transmission power level based on the detected presence of the object and an RF exposure limit associated with the detected presence; and the transmit path is configured to output another transmit signal for transmission at the transmission power level.

Aspect 16: The portable apparatus of Aspect 15, wherein the RF exposure limit is based on at least one of a specific absorption rate (SAR) or a power density (PD).

Aspect 17: The portable apparatus according to any of Aspects 1-16, wherein the receive path comprises a feedback receiver (FBRx).

Aspect 18: The portable apparatus according to any of Aspects 1-17, further comprising a transmit frequency synthesizer and a receive frequency synthesizer, wherein the diversity path is coupled to the receive frequency synthesizer, and wherein the transmit path and the receive path are coupled to the transmit frequency synthesizer.

Aspect 19: A method of operating a portable apparatus, comprising: transmitting a transmit signal from a primary antenna coupled to a transmit path; receiving, based on the transmission, one or more receive signals at a receive path via a secondary antenna and a radio frequency (RF) coupler coupled to the secondary antenna, wherein the receive path has an input selectively coupled between the transmit path and the RF coupler and wherein the RF coupler is further coupled to a diversity path; and detecting a presence of an object within a range of the portable apparatus based on the one or more receive signals.

Aspect 20: The method of Aspect 19, wherein detecting the presence of the object comprises: modeling the channel between the primary antenna and the secondary antenna; and detecting the presence of the object based on perturbations in the model of the channel over time according to the one or more receive signals.

Aspect 21: The method of Aspect 20, wherein detecting the presence of the object comprises: determining a change in magnitude of the one or more receive signals based on the model of the channel; and detecting the presence of the object based at least in part on the change in magnitude.

Aspect 22: The method of Aspect 20, wherein detecting the presence of the object comprises: determining a change in phase of the one or more receive signals based on the model of the channel; and detecting the presence of the object based at least in part on the change in phase.

Aspect 23: The method of Aspect 20, wherein detecting the presence of the object comprises: determining a change in magnitude of the one or more receive signals based on the model of the channel; determining a change in phase of the one or more receive signals based on the model of the channel; and detecting the presence of the object based at least in part on the change in phase and the change in magnitude.

Aspect 24: The method according to any of Aspects 19-23, wherein the model of the channel includes a non-linear multi-tap model.

Aspect 25: The method according to any of Aspects 19-24, wherein the model of the channel includes a Volterra model.

Aspect 26: The method of Aspect 25, wherein the Volterra model includes at least one of linear memory kernels or non-linear memory kernels.

Aspect 27: The method according to Aspect 25 or 26, wherein detecting the presence of the object comprises determining kernels for the Volterra model using a regression.

Aspect 28: The method according to any of Aspects 25-27, further comprising determining a distance between the object and the portable apparatus based at least in part on the Volterra model.

Aspect 29: The method according to any of Aspects 19-28, further comprising: determining a transmission power level based on the detected presence of the object and an RF exposure limit associated with the detected presence; and transmitting another transmit signal at the transmission power level.

Aspect 30: The method of Aspect 29, wherein the RF exposure limit is based on at least one of a specific absorption rate (SAR) or a power density (PD). The following description provides examples of an electroacoustic device for various filtering applications, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A portable apparatus for wireless communication, comprising:
   a primary antenna;
   a secondary antenna;
   a transmit path coupled to the primary antenna and configured to output a transmit signal for transmission via the primary antenna;
   a first radio frequency (RF) coupler coupled to the secondary antenna;
   a receive path having an input selectively coupled between the transmit path and the first RF coupler;
   a diversity path, wherein the secondary antenna comprises a diversity antenna and wherein the first RF coupler is a diversity coupler coupled to the diversity path and selectively coupled to the receive path;
   a memory; and
   at least one processor coupled to the memory, the at least one processor and the memory being configured to operate the portable apparatus in an object detection mode, which includes the receive path being coupled to the first RF coupler, being configured to operate concurrently with the transmit path, and being configured to receive a reflected portion of the transmit signal from an object located in proximity to the portable apparatus.

2. The portable apparatus of claim 1, further comprising:
   coupler circuitry coupled to the transmit path and selectively coupled to the input of the receive path;
   an RF switch coupled to the coupler circuitry, the first RF coupler, and the primary and secondary antennas;
   a first filter coupled between the RF switch and the primary antenna; and
   a second filter coupled between the RF switch and the secondary antenna, wherein the transmit path includes a power amplifier coupled to a third filter.

3. The portable apparatus of claim 2, further comprising:
   a first multiplexer having a first input coupled to the first RF coupler and having an output coupled to the input of the receive path;
   a second multiplexer having an input coupled to the coupler circuitry and having an output coupled to a second input of the first multiplexer; and
   a low noise amplifier coupled to the third filter.

4. The portable apparatus of claim 1, wherein the first RF coupler comprises a T-junction having a first port coupled to the diversity antenna, having a second port coupled to the diversity path, and having a third port selectively coupled to the receive path.

5. The portable apparatus of claim 1, further comprising:
   a second RF coupler coupled to the transmit path; and
   a switch having a first input selectively coupled to the second RF coupler, having a second input coupled to the first RF coupler, and having an output coupled to the input of the receive path.

6. The portable apparatus of claim 1, wherein the processor and the memory are configured, in the object detection mode, to:

obtain one or more signals indicative of mutual coupling between the primary antenna and the secondary antenna and reflections from the object; and detect a presence of the object within a range of the portable apparatus based at least in part on a model of a channel between the primary antenna and the secondary antenna.

7. The portable apparatus of claim 6, wherein the processor and the memory are further configured, in the object detection mode, to:

determine a change in magnitude of the one or more signals based on the model of the channel; and detect the presence of the object based at least in part on the change in magnitude.

8. The portable apparatus of claim 6, wherein the processor and the memory are further configured, in the object detection mode, to:

determine a change in phase of the one or more signals based on the model of the channel; and detect the presence of the object based at least in part on the change in phase.

9. The portable apparatus of claim 6, wherein the processor and the memory are further configured, in the object detection mode, to:

determine a change in magnitude of the one or more signals based on the model of the channel;

determine a change in phase of the one or more signals based on the model of the channel; and detect the presence of the object based at least in part on the change in phase and the change in magnitude.

10. The portable apparatus of claim 6, wherein the model of the channel includes a non-linear multi-tap model.

11. The portable apparatus of claim 6, wherein the model of the channel includes a Volterra model.

12. The portable apparatus of claim 11, wherein the Volterra model includes at least one of linear memory kernels or non-linear memory kernel.

13. The portable apparatus of claim 11, wherein the processor and the memory are further configured to determine kernels for the Volterra model using a regression.

14. The portable apparatus of claim 11, wherein the processor and the memory are further configured to determine a distance between the object and the portable apparatus based at least in part on the Volterra model.

15. The portable apparatus of claim 6, wherein:

the processor and the memory are further configured to determine a transmission power level based on the detected presence of the object and an RF exposure limit associated with the detected presence; and the transmit path is configured to output another transmit signal for transmission at the transmission power level.

16. The portable apparatus of claim 15, wherein the RF exposure limit is based on at least one of a specific absorption rate (SAR) or a power density (PD).

17. The portable apparatus of claim 1, wherein the receive path comprises a feedback receiver (FBRx).

18. The portable apparatus of claim 1, further comprising a transmit frequency synthesizer and a receive frequency synthesizer, wherein the diversity path is coupled to the receive frequency synthesizer, and wherein the transmit path and the receive path are coupled to the transmit frequency synthesizer.

19. A method of operating a portable apparatus, comprising:

transmitting a transmit signal from a primary antenna coupled to a transmit path;

receiving, based on the transmission, one or more receive signals at a receive path via a secondary antenna and a radio frequency (RF) coupler coupled to the secondary antenna, wherein the receive path has an input selectively coupled between the transmit path and the RF coupler and wherein the RF coupler is further coupled to a diversity path; and detecting a presence of an object within a range of the portable apparatus based on the one or more receive signals.

20. The method of claim 19, wherein detecting the presence of the object comprises:

modeling a channel between the primary antenna and the secondary antenna to generate a model of the channel; and detecting the presence of the object based on perturbations in the model of the channel over time according to the one or more receive signals.

21. The method of claim 20, wherein detecting the presence of the object comprises:

determining a change in magnitude of the one or more receive signals based on the model of the channel; and detecting the presence of the object based at least in part on the change in magnitude.

22. The method of claim 20, wherein detecting the presence of the object comprises:

determining a change in phase of the one or more receive signals based on the model of the channel; and detecting the presence of the object based at least in part on the change in phase.

23. The method of claim 20, wherein detecting the presence of the object comprises:

determining a change in magnitude of the one or more receive signals based on the model of the channel;

determining a change in phase of the one or more receive signals based on the model of the channel; and detecting the presence of the object based at least in part on the change in phase and the change in magnitude.

24. The method of claim 20, wherein the model of the channel includes a non-linear multi-tap model.

25. The method of claim 20, wherein the model of the channel includes a Volterra model.

26. The method of claim 25, wherein the Volterra model includes at least one of linear memory kernels or non-linear memory kernels.

27. The method of claim 25, wherein detecting the presence of the object comprises determining kernels for the Volterra model using a regression.

28. The method of claim 25, further comprising determining a distance between the object and the portable apparatus based at least in part on the Volterra model.

29. The method of claim 19, further comprising:

determining a transmission power level based on the detected presence of the object and an RF exposure limit associated with the detected presence; and transmitting another transmit signal at the transmission power level.

30. The method of claim 29, wherein the RF exposure limit is based on at least one of a specific absorption rate (SAR) or a power density (PD).

* * * * *